Figure 1:
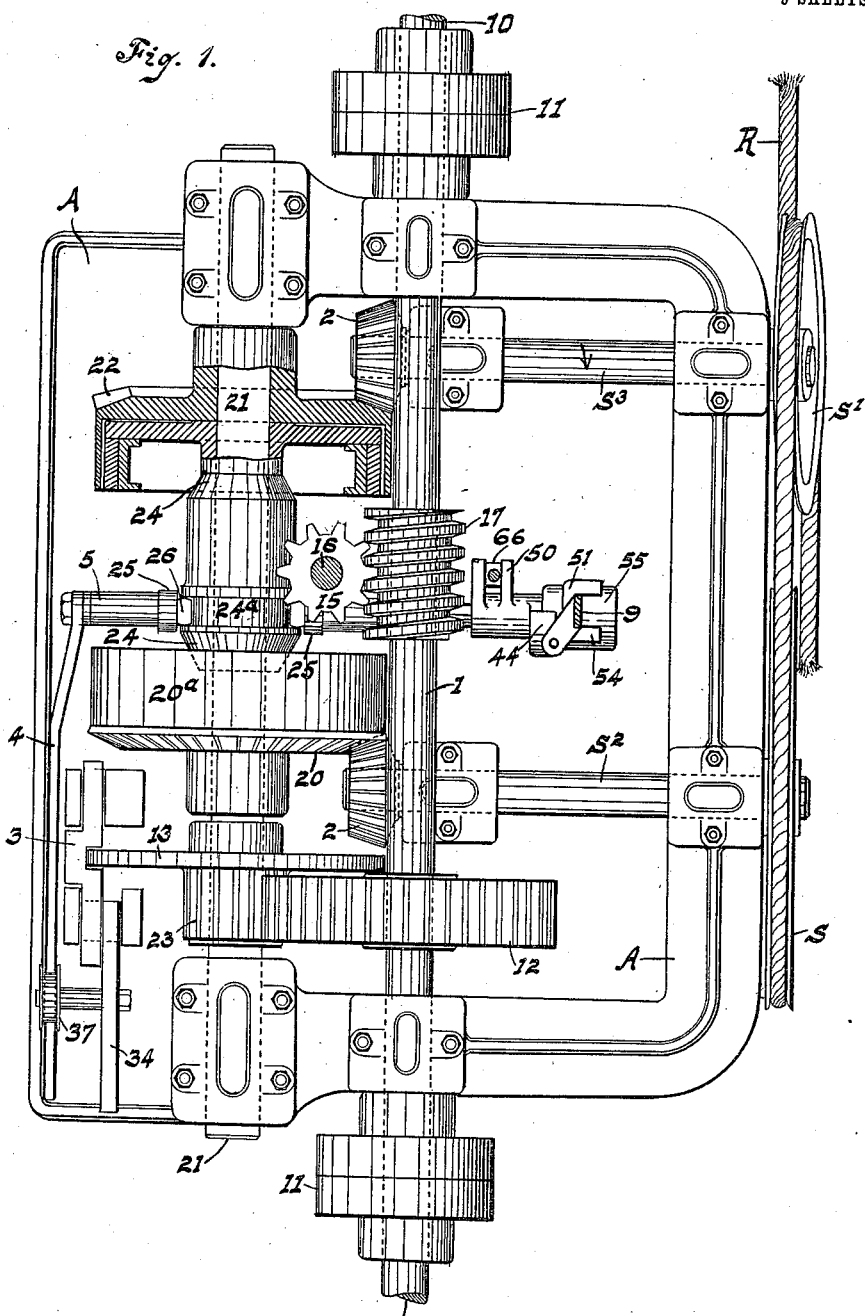

E. A. WRIGHT.
POWER SET WORKS FOR SAWMILL CARRIAGES.
APPLICATION FILED DEC. 19, 1910.

1,004,837.

Patented Oct. 3, 1911.

9 SHEETS—SHEET 1.

Witnesses

Inventor
Elmer A. Wright

Attorney.

E. A. WRIGHT.
POWER SET WORKS FOR SAWMILL CARRIAGES.
APPLICATION FILED DEC. 19, 1910.

1,004,837.

Patented Oct. 3, 1911.

9 SHEETS—SHEET 3.

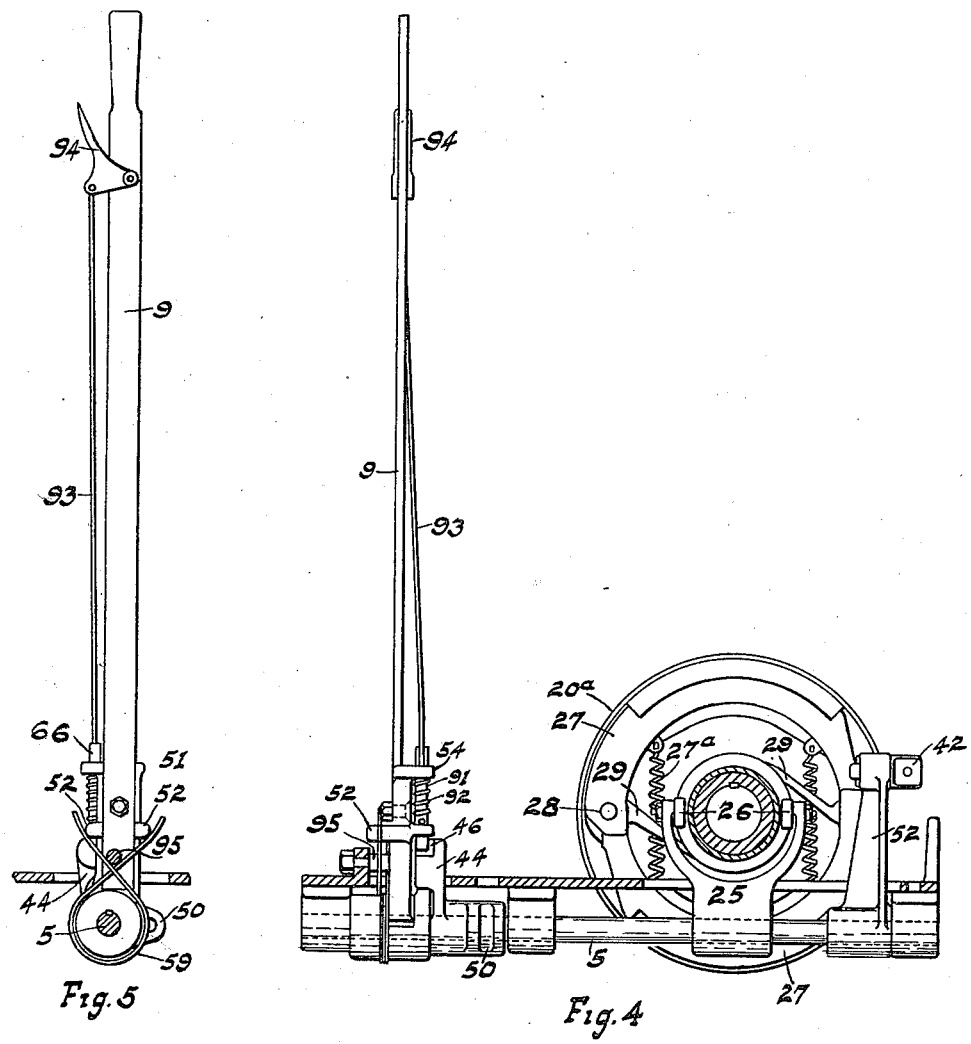

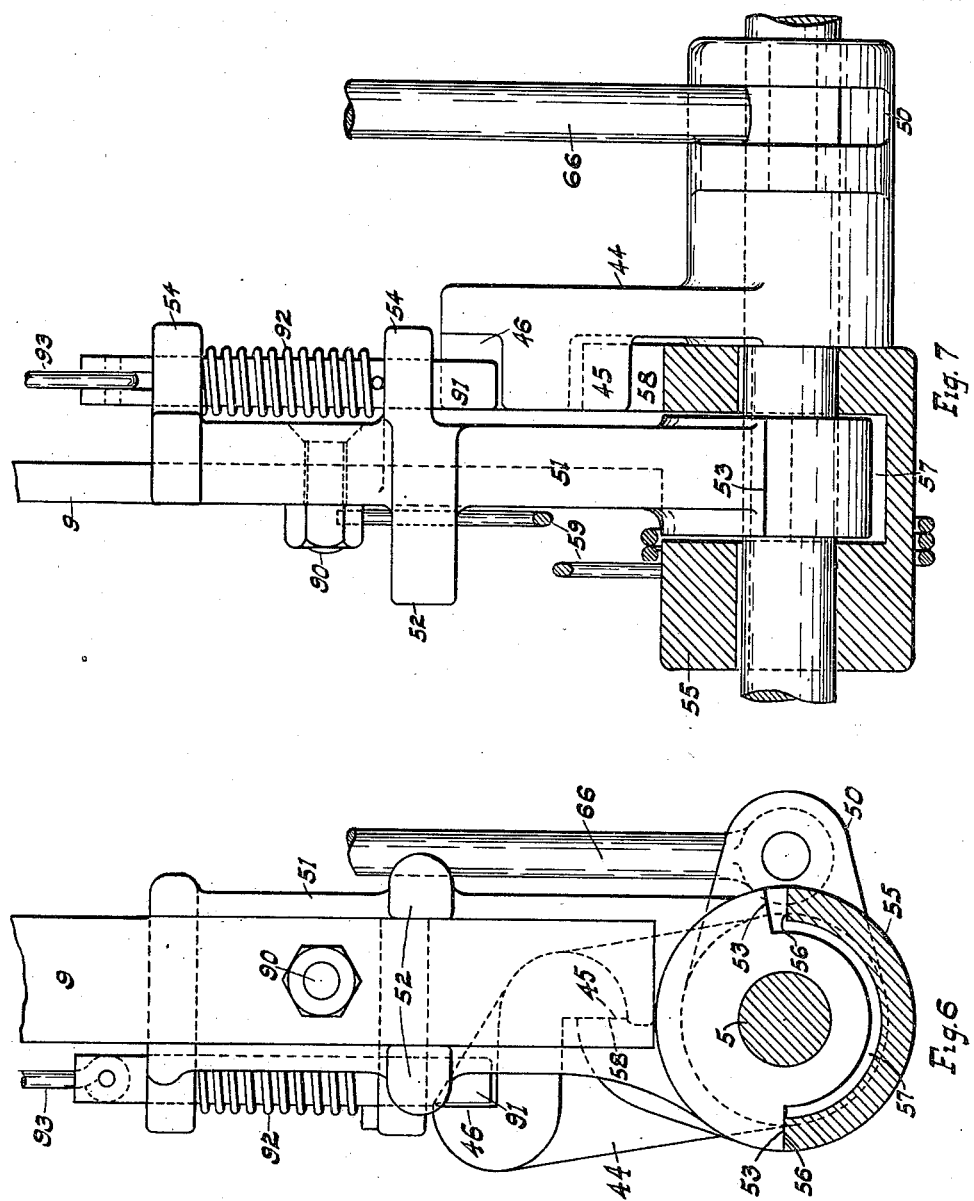

E. A. WRIGHT.
POWER SET WORKS FOR SAWMILL CARRIAGES.
APPLICATION FILED DEC. 19, 1910.
1,004,837.
Patented Oct. 3, 1911.
9 SHEETS—SHEET 6.
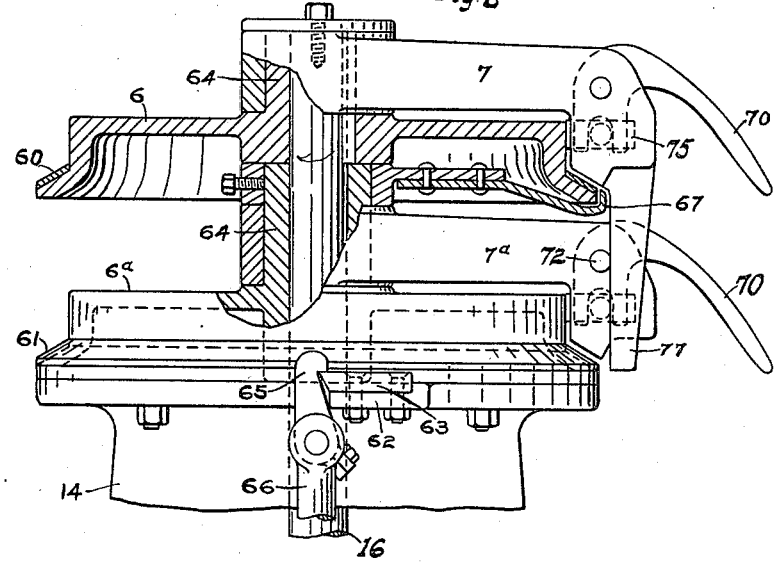
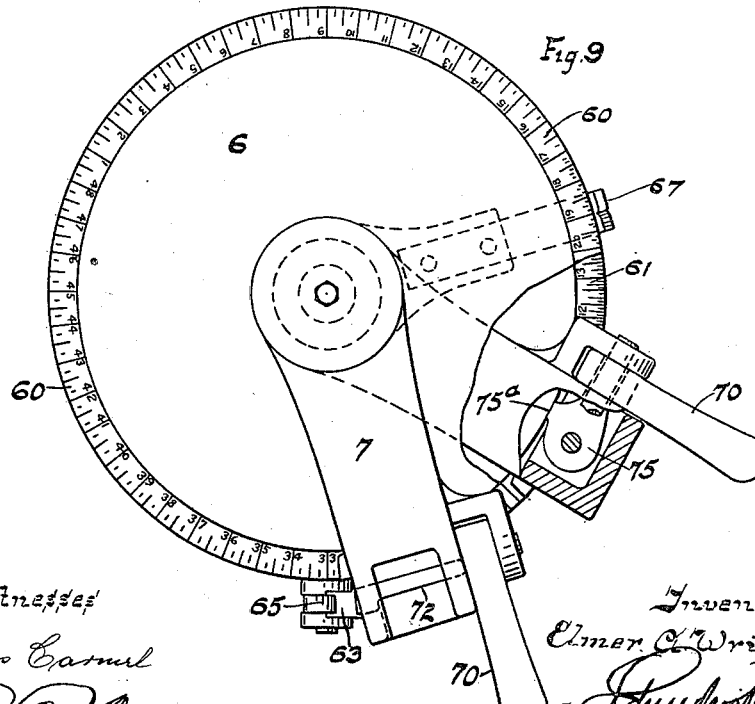

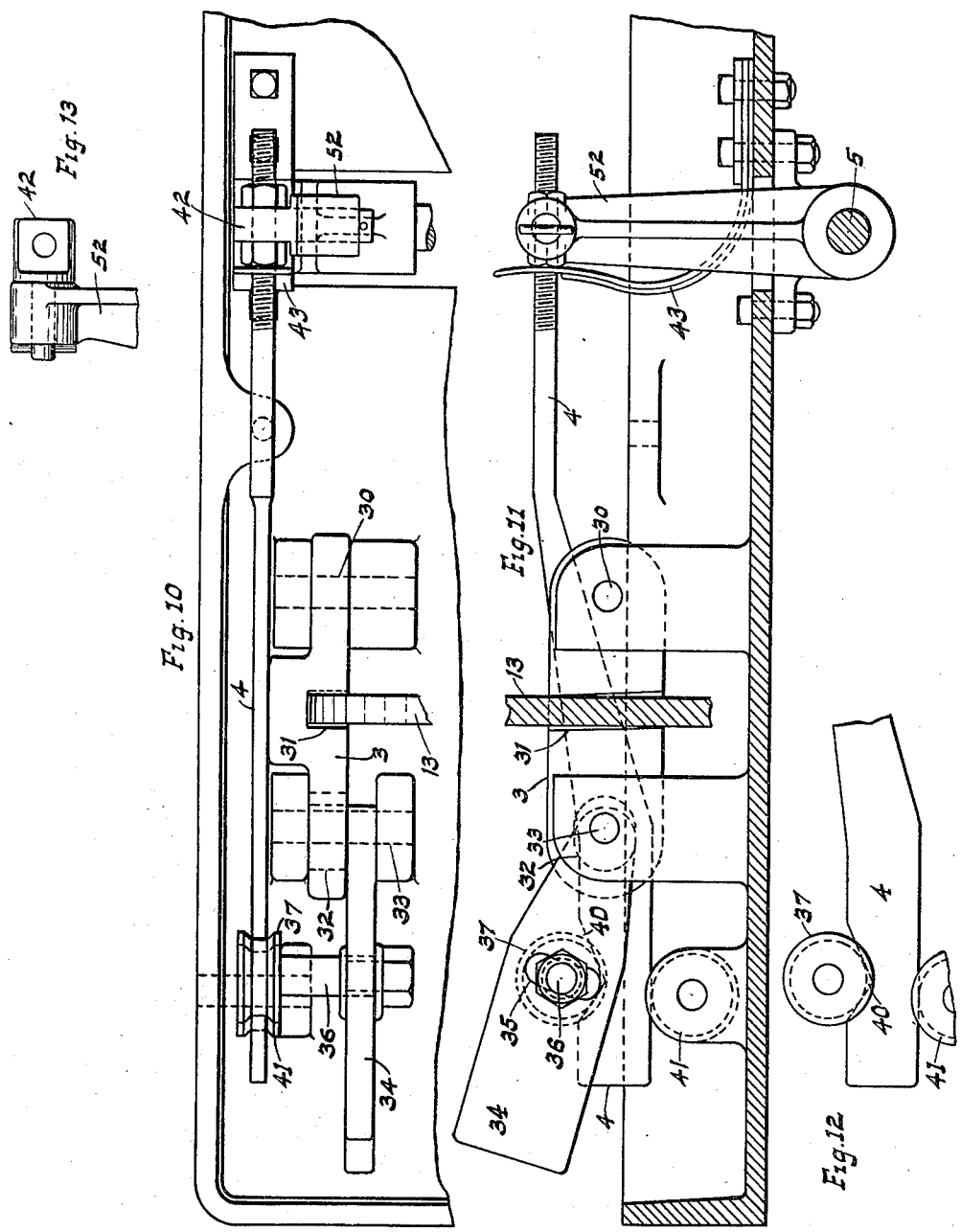

E. A. WRIGHT.
POWER SET WORKS FOR SAWMILL CARRIAGES.
APPLICATION FILED DEC. 19, 1910.

1,004,837.

Patented Oct. 3, 1911.

9 SHEETS—SHEET 8.

WITNESSES

INVENTOR
Elmer A. Wright
BY
ATTORNEY

E. A. WRIGHT.
POWER SET WORKS FOR SAWMILL CARRIAGES.
APPLICATION FILED DEC. 19, 1910.
1,004,837.
Patented Oct. 3, 1911.
9 SHEETS—SHEET 9.
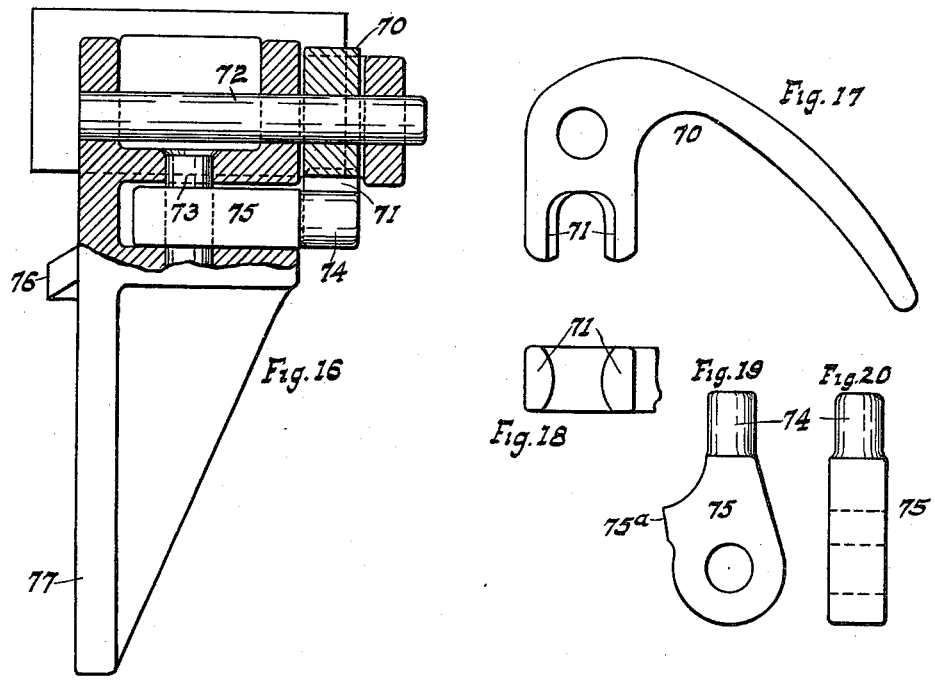
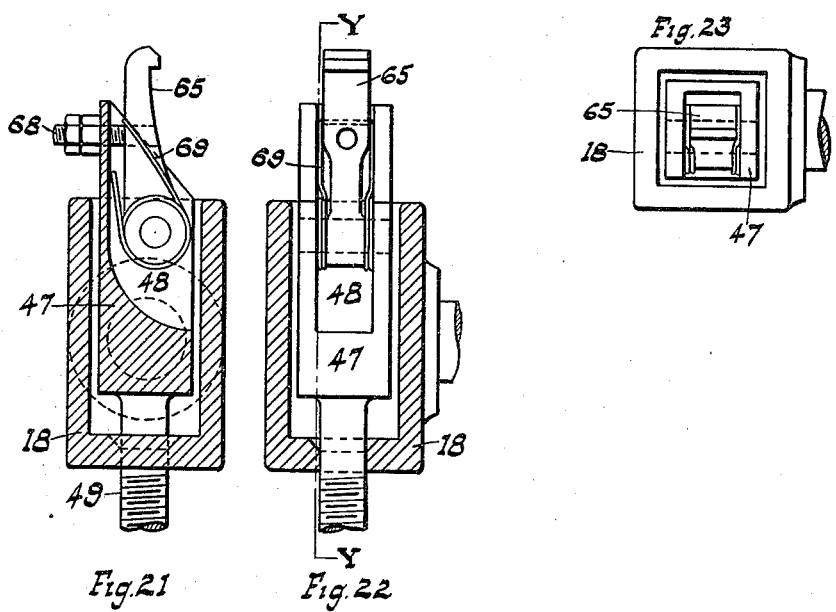

UNITED STATES PATENT OFFICE.

ELMER A. WRIGHT, OF EVERETT, WASHINGTON.

POWER SET-WORKS FOR SAWMILL-CARRIAGES.

1,004,837.   Specification of Letters Patent.   Patented Oct. 3, 1911.

Application filed December 19, 1910. Serial No. 598,110.

*To all whom it may concern.*

Be it known that I, ELMER A. WRIGHT, a citizen of the United States, residing at Everett, in the county of Snohomish, State of Washington, have invented a new and useful Improvement in Power Set-Works for Sawmill-Carriages, of which the following is a specification.

My invention relates to an improvement in power set works for saw mill carriages, and comprises the novel parts and combinations of parts which will be hereinafter described and particularly pointed out in the claims.

The object of my invention is to improve and simplify such devices and particularly the means used for determining the amount of set to be given and the convenience of making the adjustment required.

In the drawings I have shown my invention in the form which is now preferred by me.

Figure 2:
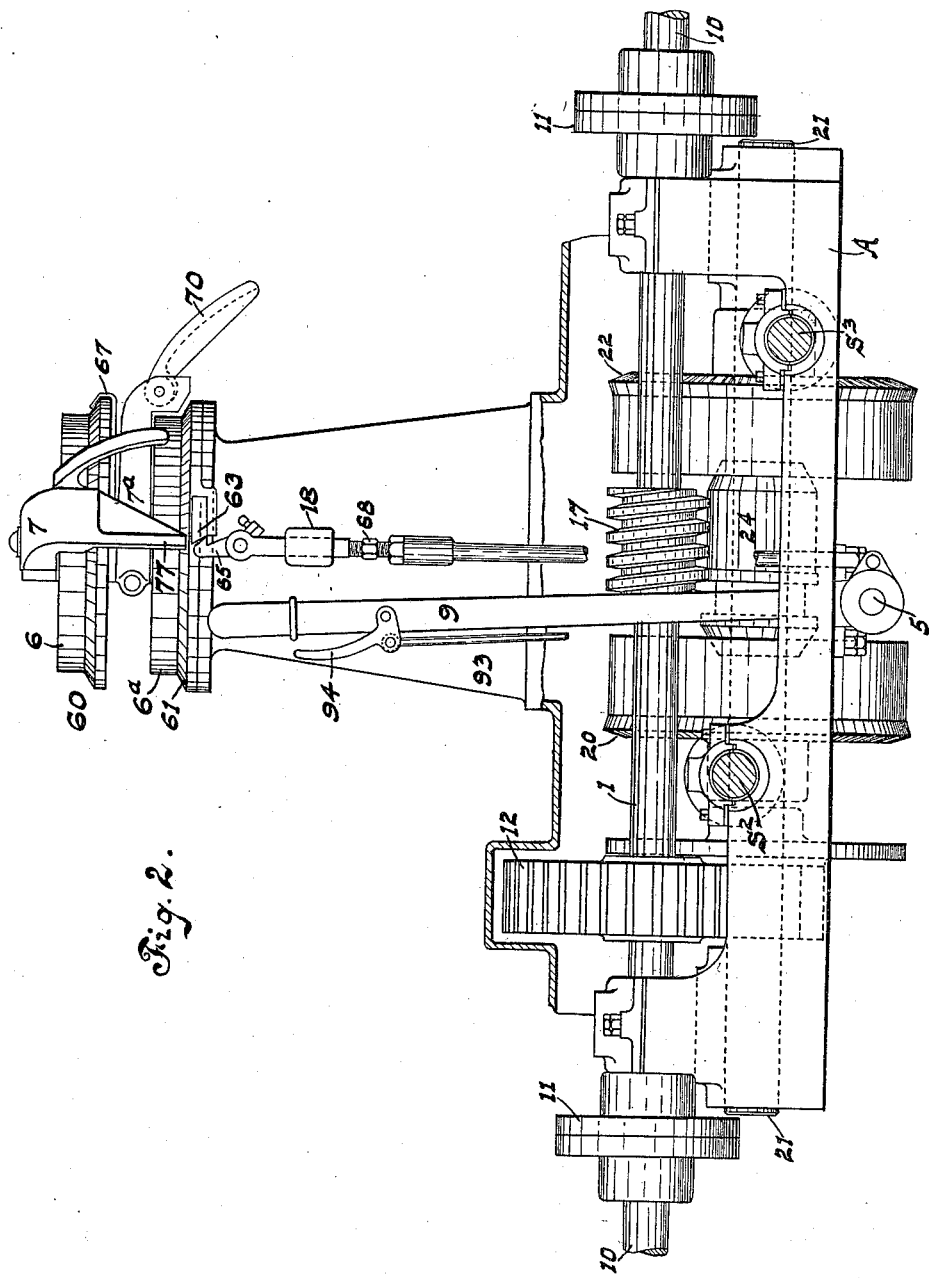
Figure 3:
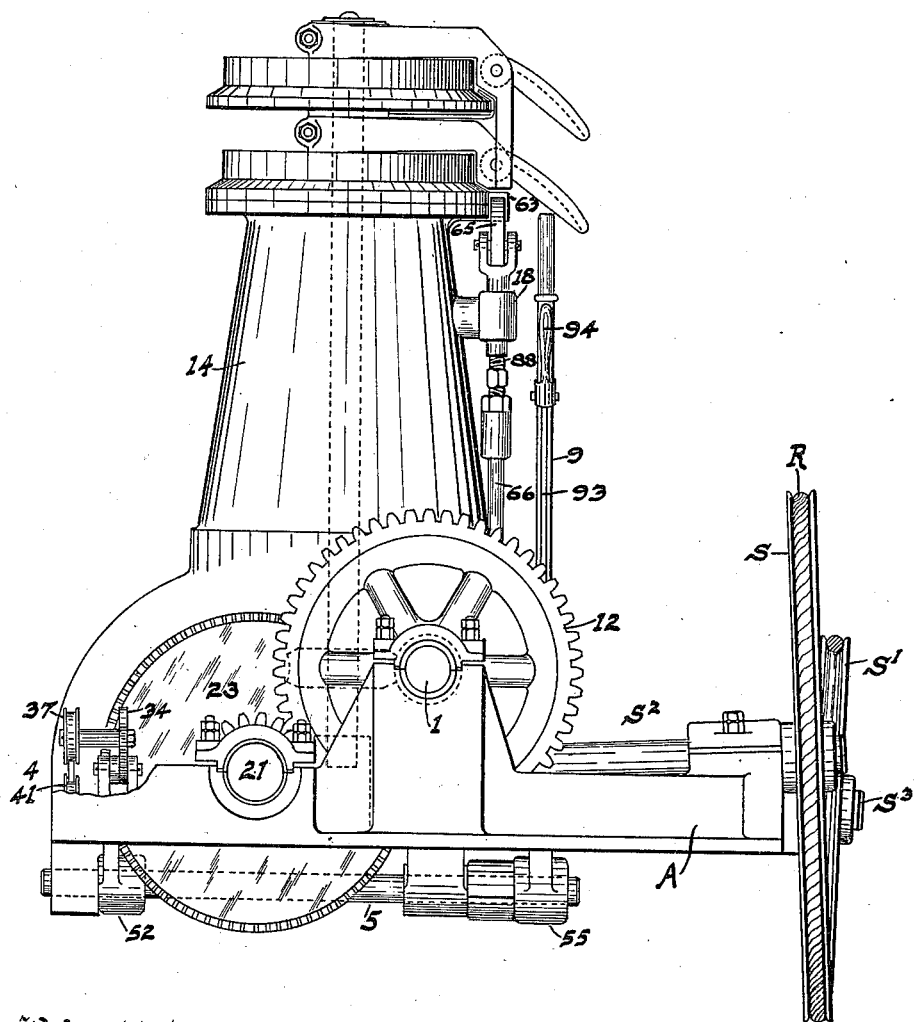
Figure 14:
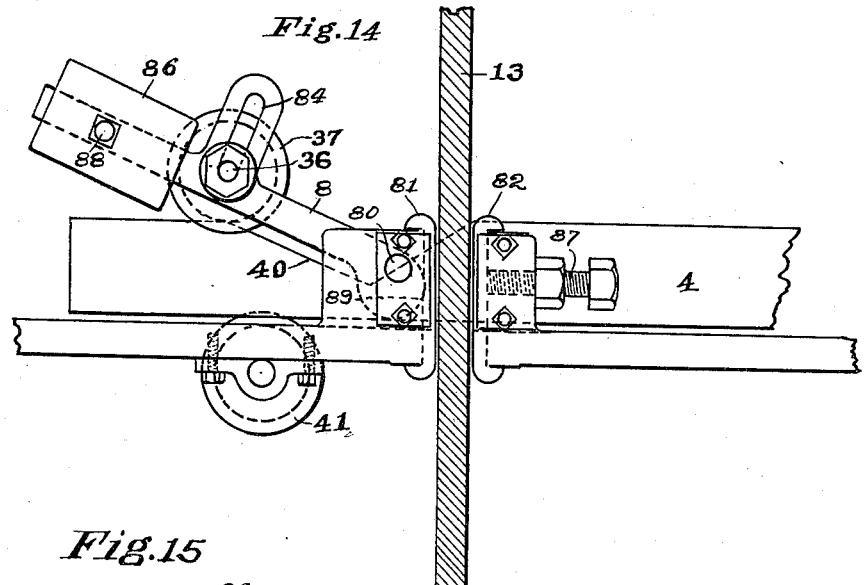
Figure 15:
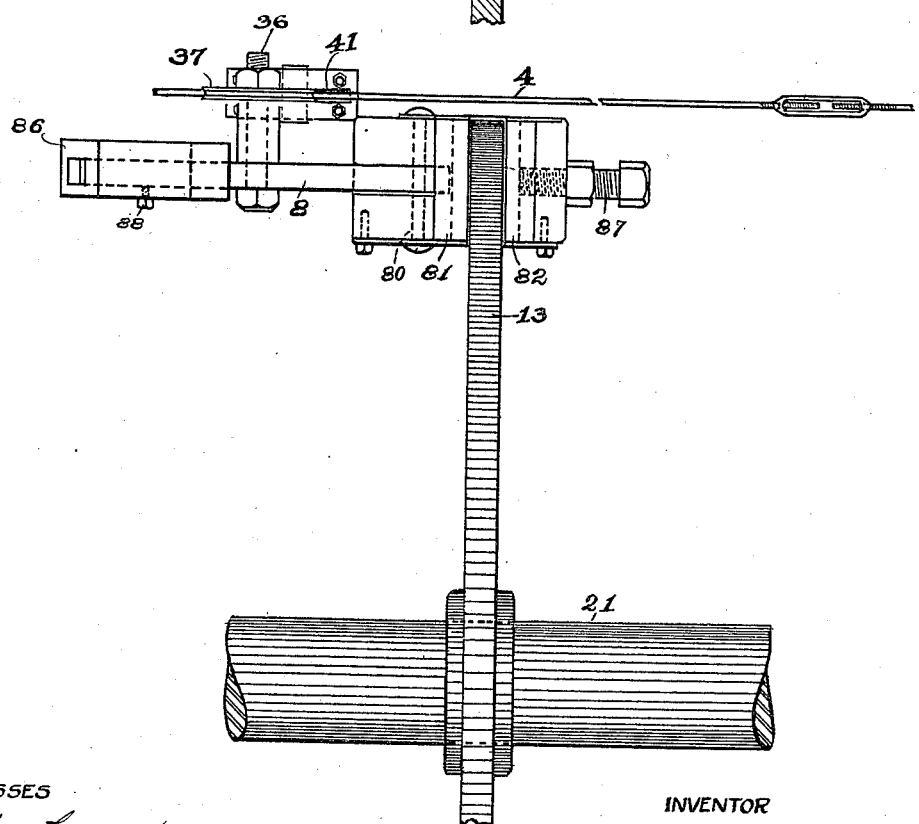

Figure 1 is a plan view of my device, the pillar and its attached measuring devices being removed. Fig. 2 is a side elevation. Fig. 3 is an end elevation. Fig. 4 is a side elevation of the rockshaft, its lever and attached parts. Fig. 5 is an end view of the rockshaft and the same attached parts. Fig. 6 is a side elevation of the controlling lever and the immediately controlled parts on the rockshaft, taken partly as a section on the line X, X, of Fig. 7. Fig. 7 is an elevation of the same parts taken from a right angular position, the part 55 being in section on a central plane. Fig. 8 is an elevation of the measuring disks and attached parts, parts of this being in section. Fig. 9 is a top plan view of the same parts, a part of one sweep or arm being broken away. Fig. 10 is a plan of the brake mechanism. Fig. 11 is an elevation of the brake mechanism. Fig. 12 is an elevation of the brake slide bar with its rollers. Fig. 13 is a side elevation of the upper end of the rock arm which controls the brake. Figs. 14 and 15 are elevation and plan of another or alternate construction for a brake. Fig. 16 is an end view, partly in section of the throw-off lever or arm. Fig. 17 is a side view of the dog setting lever carried by the throw-off arm. Fig. 18 is a bottom plan of the yoke end of the same lever. Figs. 19 and 20 are face and edge views of the friction locking dog. Fig. 21 is a sectional elevation of the catch and its carrying bar upon the plane of the broken line Y, Y, of Fig. 22. Fig. 22 is an elevation of the catch and its carrying bar, the plane of the view being at right angles to that of Fig. 21 and the inclosing case being in section. Fig. 23 is a top plan or end view of the same parts.

The most characteristic feature of my device consists of the means employed for determining the amount of feed given the log and in the manner of operating the same. I employ as part of this mechanism a device for starting the feed, and a catch or trigger for holding it in action until released. In connection with these I employ a fixed scale and a member movable in conformity with the feed of the log, adjustably mounting upon the latter a throw-off device which engages and releases the trigger upon completion of the desired feed. I also employ, in connection with the fixed scale, a setting stop for the throw-off member, which setting stop is adjustable along the fixed scale as desired. For convenience in being able to tell at a glance the amount of log left on the carriage at any time I prefer to combine a scale with the member which carries the throw-off device and which moves in conformity with the feed of the log.

There are other features contained in my invention which will appear from an inspection of the claims.

As I have herein shown my invention, it is mounted upon an individual frame A, so that it may be bodily placed upon or removed from the carriage. It is provided with a shaft 1 adapted to line up with the shaft 10 which runs lengthwise the carriage and connects all the knees to operate synchronously. I have shown the shafts 1 and 10 as connected by flange couplings 11, whereby the connection or removal of the device is a short and simple operation.

The power for operating the set works is obtained from a continuously running rope R, which passes alongside the carriage throughout the extent of its travel, and passes about two sheaves S and $S^1$, which are mounted upon horizontal shafts $S^2$ and $S^3$, carried by the frame A. Upon the inner ends of these shafts are secured bevel pinions 2 which mesh with bevel gears 20 and 22 which are loosely mounted upon a shaft 21 which extends parallel with the direction of travel of the carriage. Each of the gears 20 and 22, is provided with one part of a clutch device, the other part being carried directly by the shaft 21. The connection of the bevel pinions and gears is such that the gear 20 turns oppositely to gear 22, from which it follows that the direction of turning of the shaft 21 depends upon which of the gears 20 or 22 is connected with the shaft by its clutch. In this way the direction of movement of the carriage knees is controlled. It is the shaft 10 which directly drives the mechanism for moving the carriage knees. The shaft 1 of my device is an extension of the shaft 10. This shaft has a gear 12 secured thereto and shaft 21 has a pinion 23 secured thereto and meshing with gear 12.

The type of friction clutch used is largely immaterial. That herein shown comprises a flange or ring 20$^a$ which is secured to the gears 20 and 22 and has within it friction segments 27 which are expanded by lever arms 29 which are operated by movement of the cones 24 lengthwise the shaft. As the form of friction clutch used is no part of my invention, detailed description of the clutch is unnecessary. The two cones 24 are formed upon opposite ends of the same member, which member has a peripheral groove 24$^a$, which receives rollers 26 carried by the yoke arm 25, this arm being secured to a rock shaft 5, which extends transversely of and beneath the clutch shaft 21. It is through the operation of this rock shaft that the various mechanisms are controlled. The shaft 21 has a brake disk 13 secured to turn with it. As shown, this is secured to the pinion 23. The brake mechanism in its preferred form is shown in Figs. 10 and 11 in detail. This construction is as follows. A lever 3 is pivoted at 30, and has a notch 31 which receives the edge of disk 13. This slot is just wide enough to permit free passage of the edge of the disk when the axis of the notch is true with the plane of the disk. If the lever be swung so as to place the slot at an angle with the disk, it will clamp the disk and stop it almost immediately. The end of the lever 3 opposite its pivot is supported by a lever 34, pivoted upon pin 33. This end of lever 3 has a hole which receives an eccentric, cam or eccentrically located pin 32, so that if lever 34 is swung up or down it will correspondingly move the end of lever 3. The lever 34 carries a pin or stud, 36, adjustable in slot 35, upon which is a roller 37 which rests upon a bar 4 which has a notch 40 adapted to receive the roller or wheel 37 when the bar is in its normal position. The bar 4 in turn rests upon a roller or wheel 41 so that it may slide lengthwise freely. The other end of rod 4 is secured to the end of rock arm 52 by an eye bolt 42 which is free to turn in the rock arm. The rock arm 52 is secured to the rock shaft 5. A spring 43 engages the rod 4, being substantially free of strain when the rod 4 is in its normal position, or as shown in Figs. 10 and 11. If the rod be moved toward the left this spring is put under tension and will return the rod to the position shown, or that which causes the brake 3 to grip disk 13. Moving the bar 4 in either direction from this position raises wheel 37 out of the notch 40 and frees the brake. The stud 36 is made adjustable in slot 35 so that the brake may be adjusted to just free the disk 13 when the roller 37 is raised out of the notch 40.

In Figs. 14 and 15 is shown another form of brake. In this the brake disk 13 is the same but the mechanism for engaging it is different. Mounted upon either side of the brake disk 13 are shoes 81 and 82, supported from the frame. The shoe 81 is capable of slight movement toward and from the disk. A lever 8 pivoted at 80 has an eccentric head 89 engaging the shoe 81 to force it against the brake disk. This lever carries a weight 86 adjustable along the lever and secured in place by a set screw 88. This lever also has a slot 84 so that wheel 37 may be adjusted in position. Mounted in a position which will be convenient for the operator, is the mechanism by which the amount of feed of the log is determined. This is shown separately in Figs. 8 and 9 and some of its parts in detail in Figs. 16 to 23. A vertical shaft 16 extends upward within a pillar 14 and at its upper end has secured to turn therewith, a disk 6. Beneath this is a stationary disk 6$^a$, secured to the top of the pillar 14. These two disks are substantially alike in construction although somewhat different in function. Both disks are provided with flanges extending about their lower portions, upon which are placed scales 60 and 61. Preferably the scales are upon separate rings which are secured to the disks. The scales upon the two disks are, however, made to read in opposite directions, as is shown in Fig. 9. The scale 60 upon the rotative disk reads toward the left, and when the device is operated to advance the log the disk turns right-handedly. The purpose of this scale is to show how much of the log is left upon the carriage. The scale 61 upon the lower disk reads right-handedly. It is by this scale the device is set to determine the amount of the feed and the thickness of the lumber to be cut. At one side of the lower disk 6$^a$, projects a lug 62, preferably having a wear block 63 secured to its upper surface. This is engaged by a catch or dog, 65, which is pivotally connected to a rod 66 which at its lower end is connected with and operated by a rock arm or crank 50. While in the preferred form of construction the two ends of this rod are not strictly the same piece of metal, they are so connected as to be one in effect.

When the rock shaft 5 is rocked in one direction it applies the clutch connected with gear 20, releases the brake and raises the dog or catch 65 until it engages the block 63, or as shown in Fig. 8. As shaft 16 has a worm wheel 15 thereon and shaft 1 has a worm 17 engaging wheel 15, the upper disk 6 will be turned right-handedly. Each disk, 6 and 6ª is shown as provided with an upwardly extending sleeve 64. Upon the sleeve of the disk 6ª is pivoted an arm 7ª. Upon the sleeve of the disk 6 is pivoted an arm 7, these two arms being made alike in most respects. The locking or securing mechanism is the same for both. Additional detail views of this are shown in Figs. 16 to 20. Fig. 16 is an end view of the upper arm, 7, part of this being in section. In the outer end of the arm upon a horizontal pivot, 72, is pivoted a gravity lever 70, shown detached in side view in Fig. 17 and in partial bottom plan in Fig. 18. This has a yoke or fork 71 which embraces the end 74 of the friction dog 75 which is pivoted upon the vertical pivot 73. This dog has a surface 75ª adapted to frictionally engage the vertical peripheral surface of the disk, 6 or 6ª as the case may be. By this device either of the arms 7 or 7ª may be secured to its disk in any location. These arms have an edge 76 from which the readings of the scale are taken. The upper arm 7 has a finger 77 extending downward, the path of its lower end being such as to engage the dog or catch 65 and release it when, it its forward motion, it reaches this point.

In connection with the rotative disk 6 and its scale, if a fixed pointer be provided and located so that it reads zero when the carriage knees have been advanced to the saw line, then the amount of the log left upon the carriage will be directly indicated upon the scale. The lower arm 7ª and its friction dog acts as an adjustable stop determining the position in which the knock-off finger 77 of the arm 7 may be set. The arm 7ª is set to correspond to the thickness of lumber to be cut. The arm 7 is then set back until it contacts with the arm 7ª. The rock shaft 5 is then rocked so as to apply the clutch to turn shaft 21 from gear 20, it will thereby start disk 6 turning right-handedly. It will also raise dog or catch 65, which will engage block 63 and retain the parts in this condition until dog 65 is knocked off by the knock-off finger 77. When this occurs spring 43 sets the brake, and releases the clutch and the feed stops. So long as the same thickness of lumber is to be cut the setting consists only in moving the arm 7 back until it contacts with the adjustable stop, that is, the arm 7ª, before rocking the rock shaft. When another thickness is to be cut, the lower stop or arm 7ª must be first re-set.

The lever by which the rock shaft 5 is actuated and controlled is shown together with the rock shaft and its connected parts in Figs. 4 and 5 and the connection of the lever thereto is shown in detail in Figs. 6 and 7. The bar 9 of this lever is secured by bolt 90 within a socket or groove in a casting 51. This casting has a bore in its lower end fitting over but not secured to the shaft 5. Secured to the shaft by a key, or otherwise, is a casting 55 which has a pocket 57 therein extending about the shaft and accommodating the pivot end of the lever head casting 51. The casting 55 has shoulders or stop surfaces 56 at each side of the socket 57 adapted to be engaged by shoulders 53 upon the lever head 51. The angular position of these engaging surfaces is such that a limited swing of the lever is possible between engagement of these stops on one side to engagement upon the other side. The rock arm or lever 50 with which the dog or catch 65 is connected, is part of a casting which has an arm 44 lying alongside the lever 9 and its pivot head 51. The block 55 has an arm 58 which is opposed to a lug or surface 45 carried by arm 44, whereby the block 55 may swing in one direction without moving arms 44 and 50, but will rock them when swung in the other direction, the parts 44, 50 not being directly secured to the shaft, being only pivoted thereon. The arm 44 has another lug 46 which faces oppositely to 45 and is adapted to be engaged by a latch pin 91, mounted to reciprocate lengthwise the shaft in guides 54 connected with the lever head 51. Spring 92 holds the latch pin down and it may be raised through a latch lever 94 and rod 93. When the latch pin 91 is down, or in the position shown in Figs. 6 and 7, the arm 50 is locked to turn with the shaft. When the latch pin is raised the shaft may be rocked in one direction without affecting the rock arm 50 and latch 65.

The normal position of the lever 9 or the position of rest when not in use, is that shown in Fig. 6. In this position the surfaces 53 and 56 are in engagement, and swinging the lever to the left will rock the shaft without any delay or slack. This is the direction in which the lever is moved to feed the log toward the saw. This raises the catch or dog 65 to engage it with the block 63. Surrounding the block or hub 55 is a spring 59 its ends crossing and engaging opposite sides of lugs 52 carried by the lever head. A pin 95, supported in fixed position lies above and between the ends of the spring, acting as a stop therefor and preventing the spring arms acting upon the lever except in one direction. The angle of play possible between the lever and the shaft, that is between surfaces 53 and 56, is sufficient to apply the friction clutch and engage the catch 65. After these have been engaged, if the lever is released, the spring 59 will return the lever to its normal position of rest, and before the catch 65 is released.

In swinging the lever in the opposite direction, or to the right in Figs. 2, 5, and 6, the clutch connected with gear 22 is engaged. This turns the mechanism to feed the knees of the carriage backward. In doing this there is no need of engaging the catch 65. The clutch is held in engagement by hand until the knees have been moved far enough and is then released. In case it is desired to advance the knees, this may be done without setting the catch by releasing the latch pin 91 from the lug 46. In running the knees back, the arm 7 carried by the upper disk will quickly strike the lower arm 7$^a$. Because of the type of friction dog 75$^a$ used, the disk 6 may turn backward freely while the arm 7 is held by engagement with the lower arm 7$^a$. At some point in the rod 66 which carries the catch or dog 65 provision is made for adjustment of its length. This may be by dividing it into two parts and connecting by screw threads. I have shown a right-and-left threaded member 68 inserted between its ends.

The construction of catch which I prefer is shown in detail in Figs. 21, 22 and 23. A guide 18 is secured to the pillar 14 and receives the bar which forms the upper end or extension of the connecting rod 66. The guide and the part 47 of this member which slides therein are preferably of such cross-section that they will not turn. They are herein shown as of square cross-section. The block 47 has a recess 48 within which is pivoted the catch 65. The catch is held up by a spring 69 and its swing under the action of the spring is limited by a bolt 68 having lock nuts thereon. The lower end or shank 49 of the block 47, is threaded for attachment to the rod 66 or a part carried thereby. I have shown the disks 6 and 6$^a$ as scaled to represent 48 inches. This is not material. In case of a log larger than is represented upon the scale a second turn of the disk may be used.

What I claim as my invention is:—

1. In a power set works, in combination, a friction driving clutch, a brake member rotative through said clutch, a brake, a catch adapted to hold the clutch in action, a spring acting to release the clutch, a member moved in conformity with the feed of the log, an adjustable throw-off member carried by said last mentioned member and adapted to engage and release the catch, a lever connected with the clutch, the brake and the catch to operate them together, and means for disengaging the lever from the catch when desired.

2. In a power set works, in combination, two friction driving devices adapted to operate the parts respectively in opposite direction, a rock shaft connected to apply either of said friction driving devices by movement respectively in opposite direction from its normal position, a stop device, normally in engagement, connected with the rock shaft to be released when either of the friction driving devices is applied, a catch and means for setting the same when one friction device is applied to retain said friction in action, and a catch releasing device operative by the feeding mechanism, an operating lever having a slack connection with the rock shaft and means for returning said lever to its normal position before the catch is released.

3. In a power set works, in combination, a driving mechanism a catch adapted to hold said driving mechanism in action, an automatic releasing device for the driving mechanism, an operating lever, and means for returning the operating lever to its normal position before the release of the catch.

ELMER A. WRIGHT.

Witnesses:
DANIEL M. BEDELL,
G. H. BISHOP.

---

Copies of this patent may be obtained for five cents each, by addressing the "Commissioner of Patents, Washington, D. C."